Oct. 25, 1932.   C. H. SCHURR   1,884,293
GRINDING APPARATUS
Filed May 28, 1923   6 Sheets-Sheet 1
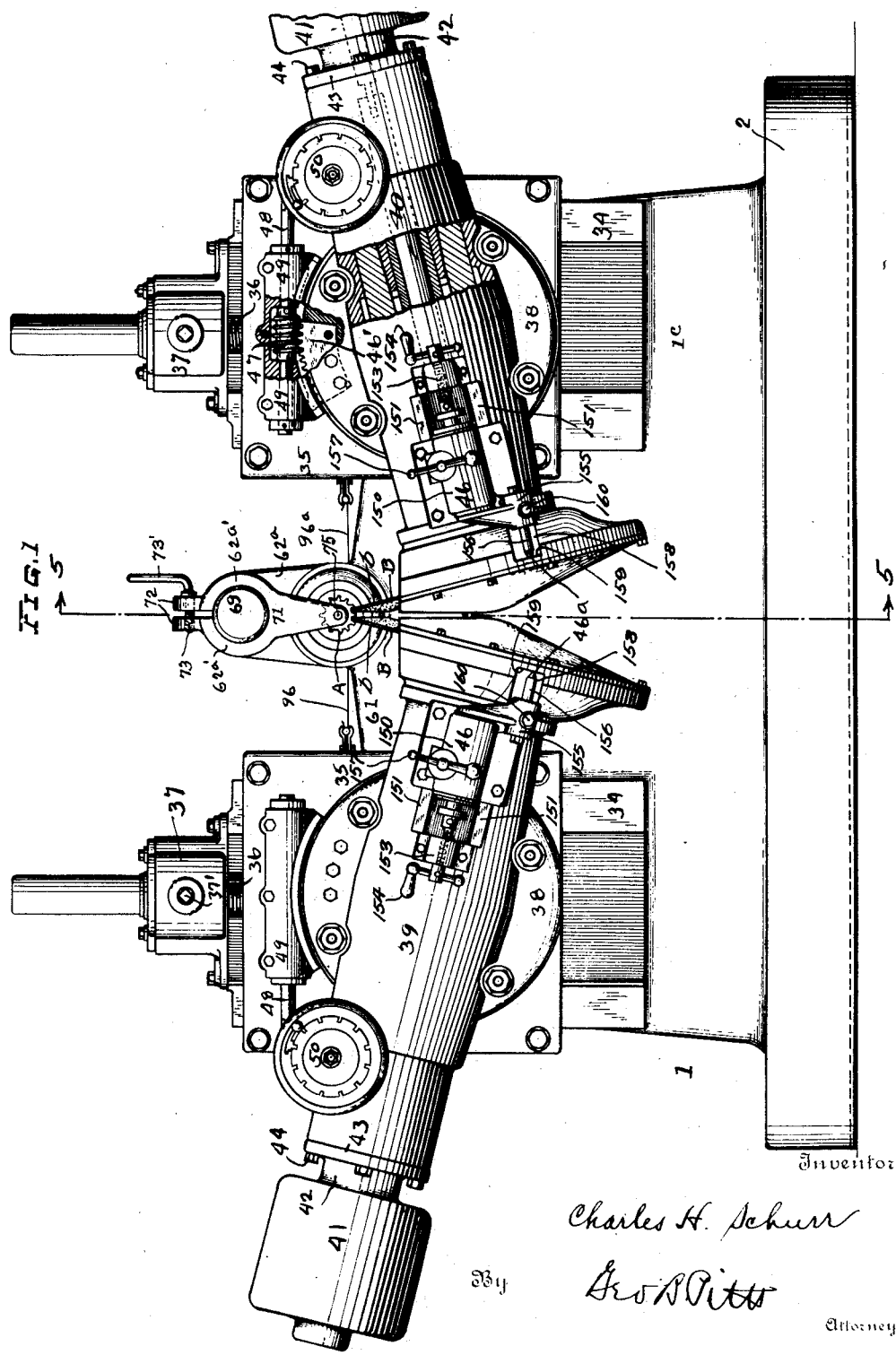
Inventor
Charles H. Schurr
By Geo. A. Pitts
Attorney

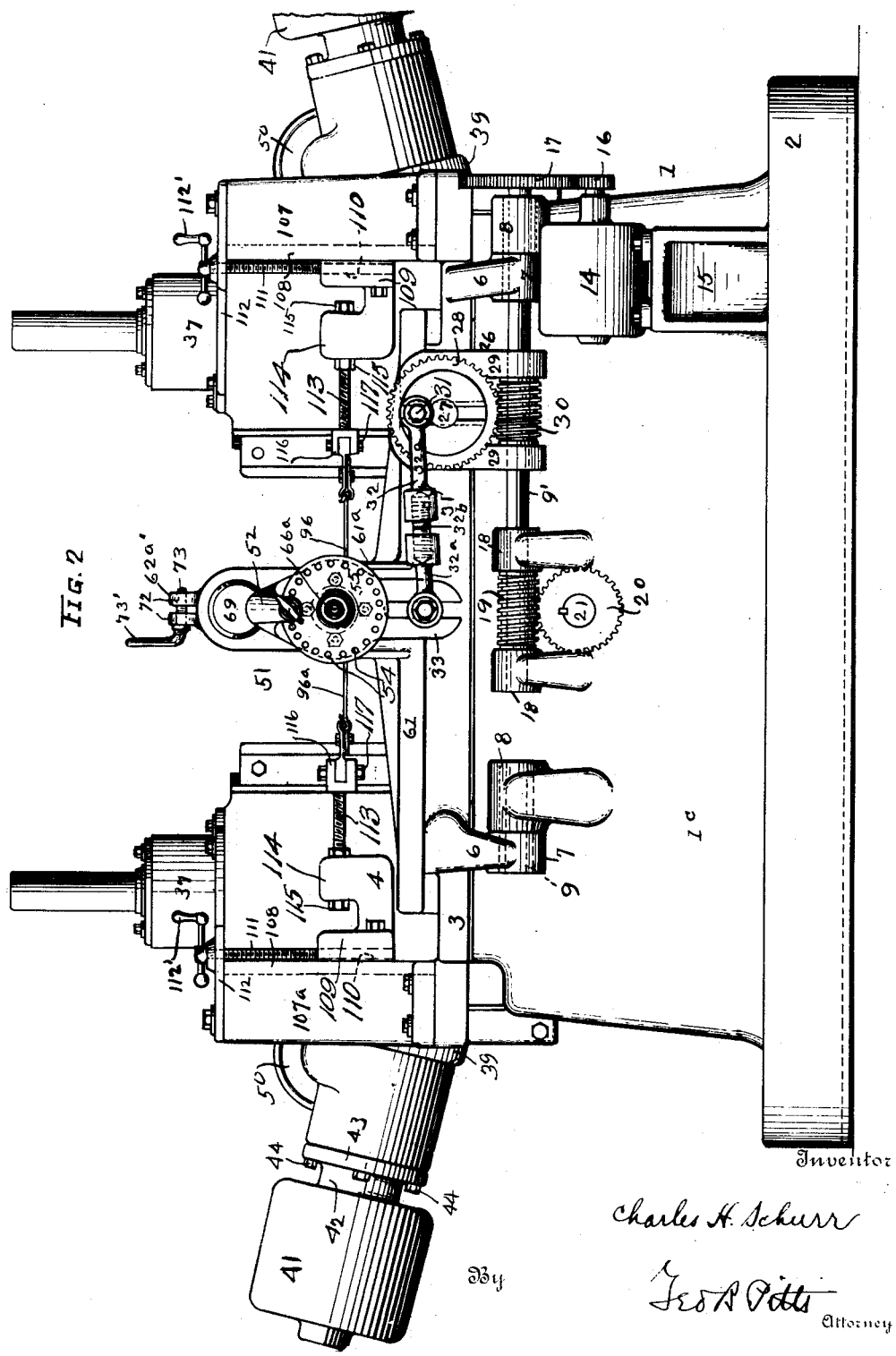

Oct. 25, 1932.  C. H. SCHURR  1,884,293
GRINDING APPARATUS
Filed May 28, 1923   6 Sheets-Sheet 3
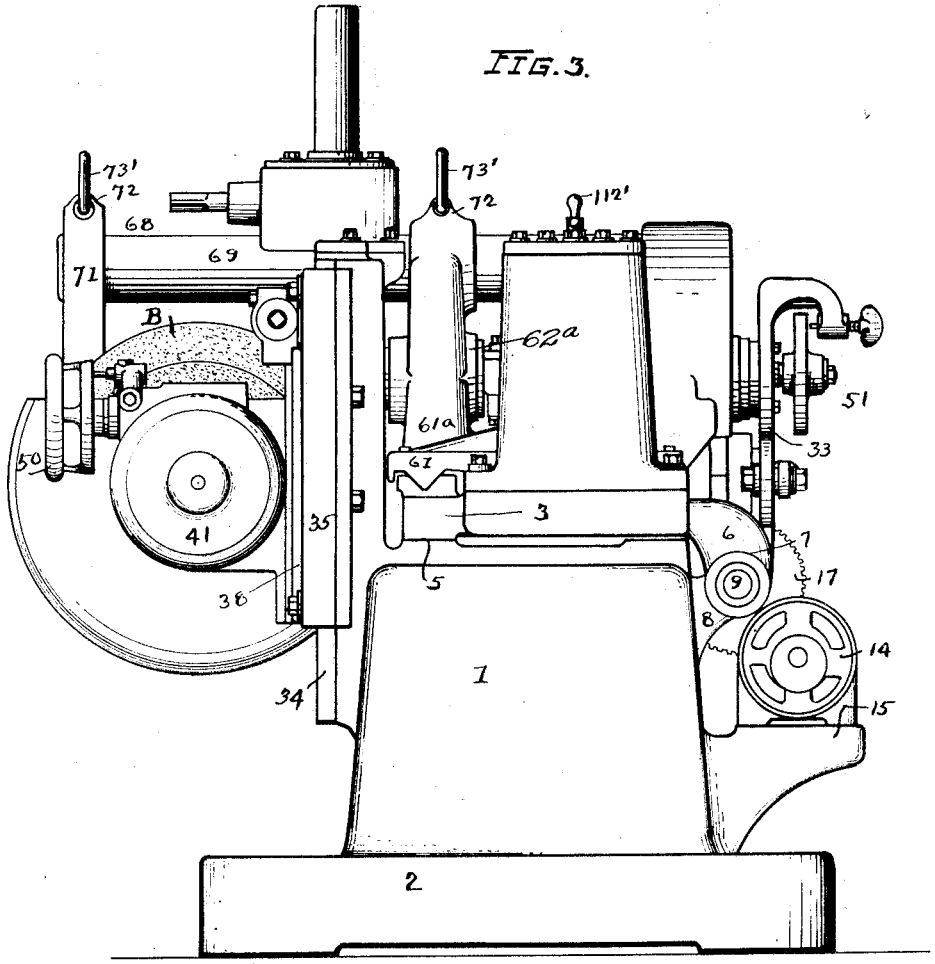
Inventor
Charles H. Schurr
By
Attorney

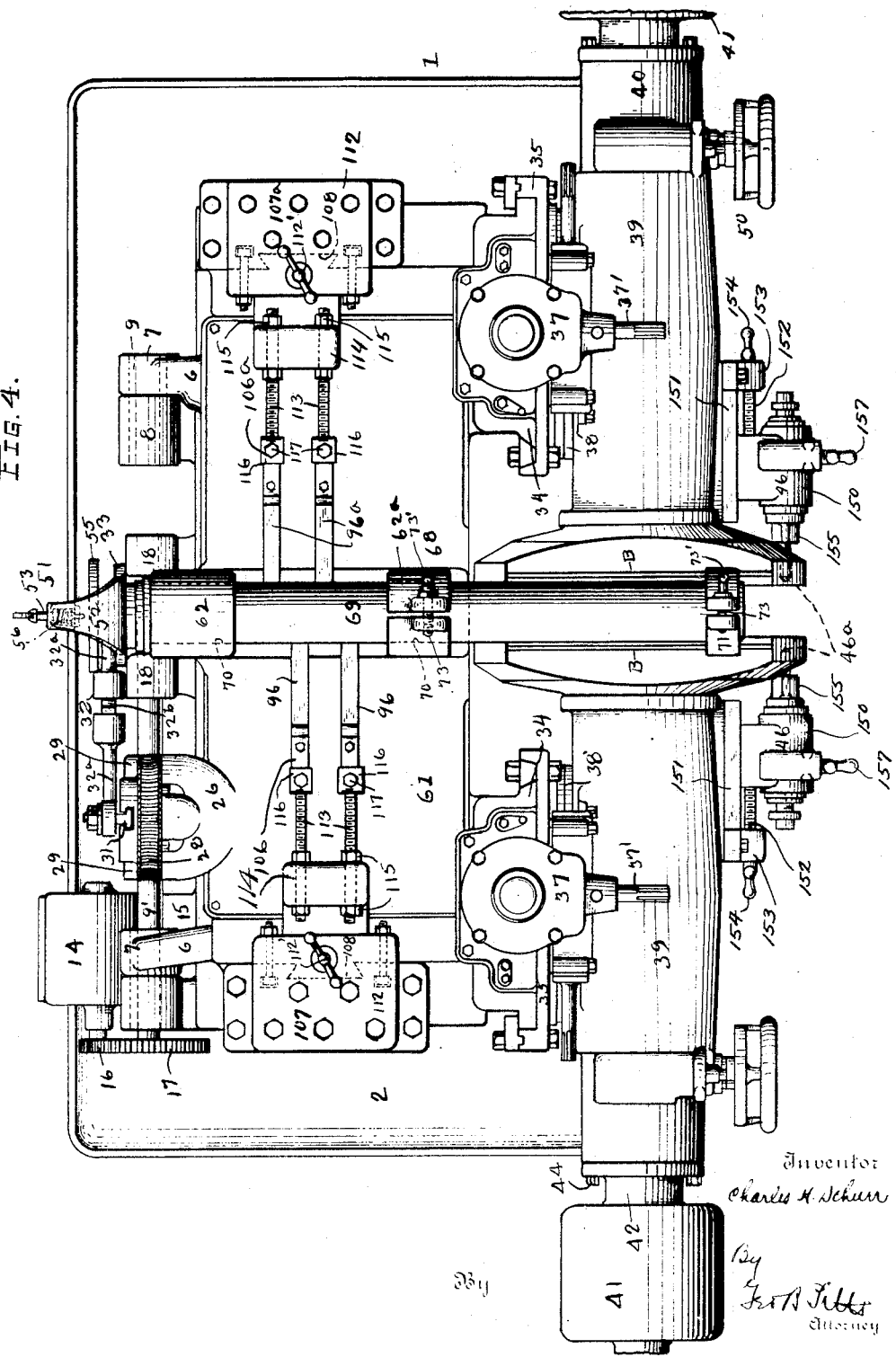

Oct. 25, 1932.  C. H. SCHURR  1,884,293
GRINDING APPARATUS
Filed May 28, 1923     6 Sheets-Sheet 5
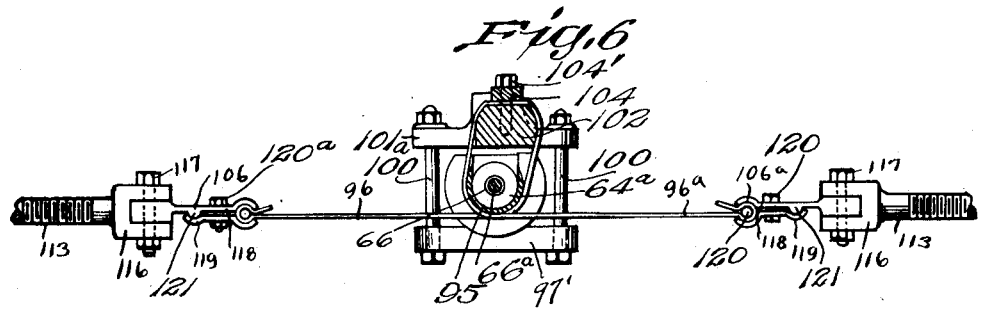
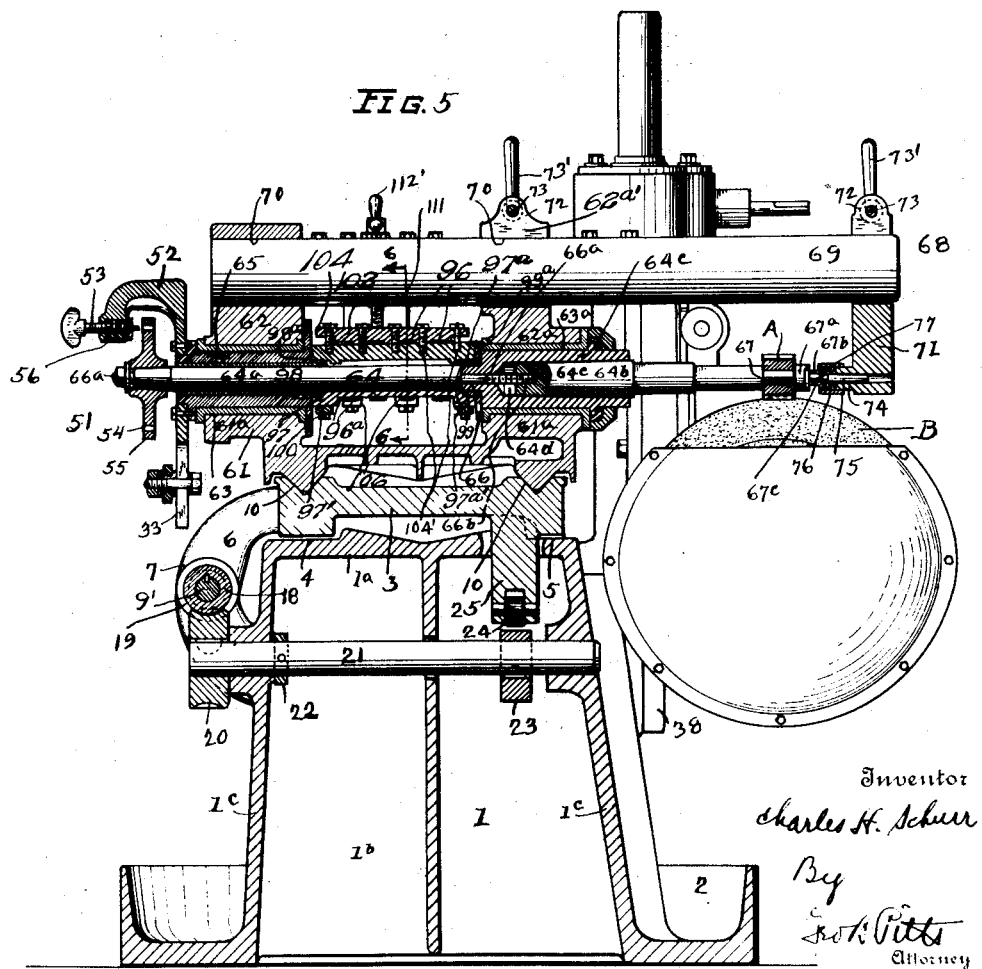

Oct. 25, 1932.  C. H. SCHURR  1,884,293
GRINDING APPARATUS
Filed May 28, 1923   6 Sheets-Sheet 6

Inventor
Charles H. Schurr
By Geo. A. Pitts
Attorney

Patented Oct. 25, 1932

1,884,293

UNITED STATES PATENT OFFICE

CHARLES H. SCHURR, OF CLEVELAND, OHIO, ASSIGNOR TO THE LEES-BRADNER COMPANY, OF CLEVELAND, OHIO, A CORPORATION OF OHIO

GRINDING APPARATUS

Application filed May 28, 1923. Serial No. 641,880.

This invention relates to an apparatus for grinding or cutting teeth or tooth faces of gears, for example, gears having teeth generated according to the involute system.

One object of the invention is to provide a machine or apparatus of this character capable of cutting or grinding a plurality of tooth faces simultaneously.

Another object of the invention is to support the gear and its operating mechanism in an improved manner, to provide ready access to the tool or tools, the gear and the gear support.

Another object of the invention is to provide an improved grinding apparatus in which the tool or tools and the supports therefor are arranged relatively low, to simplify and economize in the construction of the apparatus.

Another object of the invention is to construct an apparatus of this character wherein the gear is arranged above the tool, thereby providing ample space for the supporting of gears of any size and permitting the gears to be ground, or cut with less danger of grit or foreign matter getting between the guideways and gear support or slide.

Other objects of the invention will be apparent to those skilled in the art to which my invention relates from the followed description taken in connection with the accompanying drawings, wherein Fig. 1 is a front elevation of an apparatus embodying my invention.

Fig. 2 is a rear elevation of the apparatus.

Fig. 3 is an end elevation of the apparatus.

Fig. 4 is a top plan view of the apparatus.

Fig. 5 is a transverse section on the line 5—5 of Fig. 1.

Fig. 6 is a section on the line 6—6 of Fig. 5.

Figure 7:
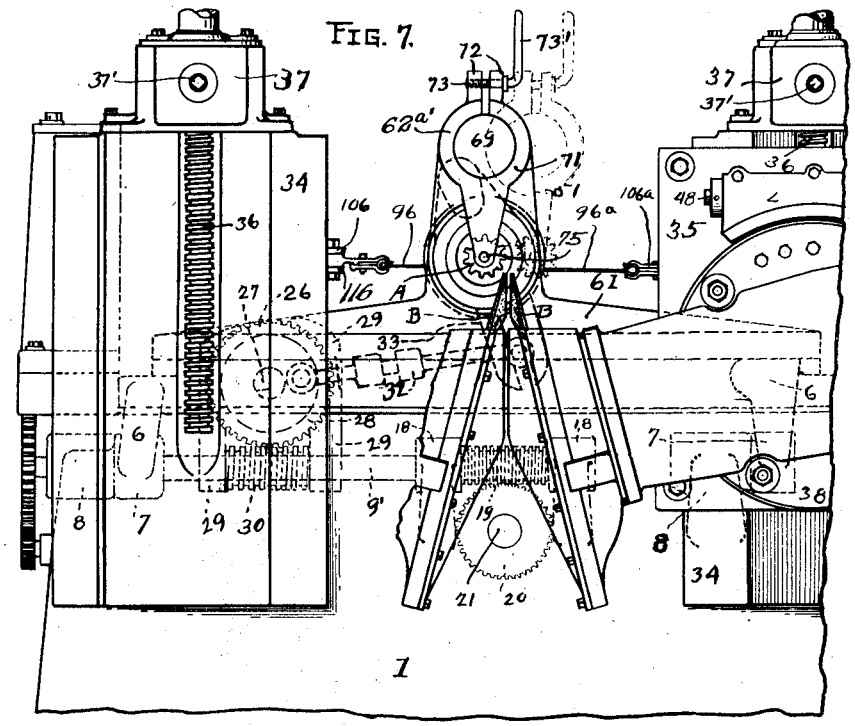
Fig. 7 is a fragmentary front elevation showing the position of the gear or work piece when it is about to move relative to the tools to be ground thereby.

In the drawings, 1 indicates a frame of suitable construction, preferably comprising a casting having a trough 2 around its lower edge. The casting is shaped to form a top wall 1a, end walls 1b, and side walls 1c. 3 indicates a supplemental frame extending longitudinally of the frame 1 and normally engaging bearing faces 4, 5, provided on the top 1a of the frame 1—see Fig. 5. On its rear edge, the supplemental frame 3 is provided with arms 6, each having a knuckle 7 aligned with a knuckle 8 provided on the rear wall of the frame 1 (see Fig. 2), which knuckles are arranged to receive pintles 9, 9', whereby the supplemental frame 3 may be swung upwardly for a purpose to be later set forth. The pintle 9' preferably constitutes a driven shaft, to which reference will later be made, so that one pair of knuckles serves as a bearing for the shaft to permit its rotation. The upper face of the supplemental frame 3 is provided with longitudinally extending ways 10 to slidably support a slide or carriage 61, whereby it may be reciprocated, as will be later described.

The carriage 61 is provided with a pair of spaced pillow blocks 61a, 61a, to which are secured cap members 62, 62a, respectively, forming bearings 63, 63a, for a work piece or blank carrying spindle 64. The spindle 64 is preferably formed in sections, as follows:—a main section 64a and a detachable section 64b. The main section 64a at one end extends through and rotatably fits a sleeve 65, which in turn is rotatably mounted in the bearing 63; at its opposite end the shaft section 64a is enlarged, as shown at 64c, such enlarged portion rotatably fitting the bearing 63a. The enlarged portion 64c of the shaft is formed with a recess 64d of tapering shape extending inwardly from its outer end, and such recess 64d receives the inner tapered end 64e of the spindle section 64b. The spindle sections 64a and 64b are preferably secured together by the following instrumentalities; 66 indicates an opening extending through the main spindle section 64a. 66a indicates a bolt extending through the opening 66, the head of the bolt engaging the outer end of the spindle section 64a, and the inner end of the bolt being screw-threaded into an opening 66b formed in the inner end of the spindle section 64b. By tightening the bolt 66a, the tapered spindle end 64e will be drawn into the opening 64d and thus rigidly secure the spindle section 64b to the section 64a. The outer end of the spindle section 64b is preferably reduced to form a shoulder 67, against which the blank A may be clamped in any desired manner, for example, by a nut 67a. The end of the shaft section 64b, beyond the threaded portion for the nut 67a is reduced as shown at 67b, and its end is formed with an opening or recess 67c arranged axially of the shaft 64b. By means of the construction just described, it will be seen that that portion of the work carrying spindle to which the blank A is clamped may be detached or removed from the main spindle section and another spindle section provided, whereby different sized blanks may be positioned for grinding or finishing by the tool or tools B.

68 indicates means for supporting the outer or free end of the work carrying spindle section 64b, whereby it may be maintained against wobbling to insure relatively accurate grinding or finishing of the sides of the gear teeth. Of the supporting means 68, 69 indicates an arm mounted in aligned openings 70, 70, formed in the cap members 62, 62a, and arranged to support at its outer end a bracket 71. By preference, the cap member 62a has a split wall forming clamping sections 62a', each provided with a lug 72. The lugs 72 are formed with screw threaded aligned openings to receive a screw 73, whereby they may be drawn together to clamp the arm rigidly in position. The screw 73 is provided with a handle 73' whereby it may be turned. By loosening the screw 73, the arm 69 may be adjusted endwise or angularly, if desired. The bracket 71 may be adjustably secured to the free end of the arm 69 by devices similar to that employed for securing the arm to the cap member 62a. The bracket 71 carries at its lower end a hollow boss 74 in which is supported a center 75. 76 indicates a stepped tubular member, the enlarged section thereof slidably fitting the boss 74 and the reduced section thereof rotatably receiving the reduced free end 67b of the spindle section 64b. The tubular member 76 serves to enclose the ends of the center and spindle end 67b to prevent water and grit from getting into the recess 67c for the center. The tubular member is held in position by a coiled spring 77 disposed between the end of the boss 74 and the bottom of the enlarged section of the tubular member, and operating to press the member against the shoulder formed by the reduced free end of the spindle.

In the herein disclosed illustrated embodiment of my invention, the gear blank A is given a rolling movement such as is required in carrying out the generating principle, on which the blank was cut. For this purpose I employ the reciprocating slide or carriage 61, already referred to, and tapes 96, 96a, which are arranged to wind and unwind about a segment connected to the work spindle 64 and having substantially the same diameter as the pitch diameter of the gear blank A to be ground.

The rolling movement of the gear A is preferably affected by the following instrumentalities: 14 indicates a motor, preferably of the electric type, supported on a suitable base 15, which may be formed integrally with the frame 1—see Figs. 2 and 3. The shaft of the motor 14 carries a pinion 16 with which meshes a gear 17, that is fixed to one end of the shaft 9', already referred to. The opposite end of the shaft 9' is mounted in a pair of bearings 18 between which is mounted a worm 19 meshing with a worm gear 20. The gear 20 is fixed to a transverse shaft 21 that is mounted in bearings provided in the front and rear walls 1c of the frame 1. A collar 22 is disposed on the shaft 21 so as to co-operate with the gear 20 to maintain the shaft 21 against endwise movement. Near its opposite end, the shaft 21 carries a cam 23 on which rides a roller 24 supported in the bifurcated end of a depending member 25, and operating therethrough to swing the frame 3 about its pivots 9, 9', in each revolution of the cam 23, for a purpose to be later set forth. 26 indicates a supporting member preferably formed integrally with and extending laterally from the slide 61 and movable therewith. The supporting member 26 comprises a body portion formed with a bearing for a shaft 27, to which is keyed a worm gear 28, and a pair of spaced arms 29 having aligned openings for the shaft 9' so as to reciprocate thereon. Between the arms 29 is arranged a worm 30, splined on the shaft 9', and meshing with the gear 28 to rotate it. 31 indicates a crank pin extending laterally from the outer face of the gear 28 and having connected to it a pitman 32. The opposite end of the pitman 32 is pivotally connected to an arm 33, connected to the spindle 64, in a manner to be later described, to effect oscillation of the latter. By preference, the pitman comprises two rods 32a, 32a, having hollow heads at their inner ends. The inner walls of the heads are screw threaded, one with a left hand thread and the other with a right hand thread, and receive the opposite ends of an intermediate rod 32b having right and left hand threads, so that upon the rotation of the rod 32b the pitman may be made longer or shorter. 95 indicates a segment surrounding the spindle 64 or a portion thereof and serving as the wall or surface about which the tapes 96, 96a, wind and unwind incident to the oscillation of the work spindle, as already described. As will be understood, the segment 95 has substantially the same pitch diameter as that of the blank A to be ground and is removably secured to the spindle 64 to permit the substitution of segments having pitch diameters substantially corresponding to any size blank which may be mounted on the spindle. As shown in Fig. 6, the upper portion of the segment 95 is cut away, whereby it may be placed on and removed from the spindle 64. At its opposite ends, the segment is provided with flanges 97, 97a; the flange 97 being adapted to be clamped to a flattened lug or shoulder 98 projecting from the inner end of the sleeve 65, and the flange 97a being adapted to be clamped against a flattened wall on one side of a supporting device 99, which loosely fits the spindle 64; this arrangement permitting (1) the segment 95 to have a fixed relation with the spindle 64 when the spindle is being oscillated as will be later set forth and (2) the spindle 64 to be rotated relative to the sleeve 65 and segment 95 to effect indexing of the gear blank A. 97', 97a' indicate cross members extending transversely of the spindle 64 and engaging the flanges 97, 97a. 100 indicates bolts which extend through openings formed in the opposite ends of the cross members 97', 97a', and engage cross members 101, 101a, provided at the opposite ends of a clamping plate 102, the cross member 101 engaging a lug or shoulder 98a projecting from the sleeve 65 but at the opposite side of its axis from the lug 98 and the cross member 101a engaging a flattened wall 99a at the other side of the supporting device 99, whereby the bolts may operate through the cross members to clamp and removably support the segment 95 in position. The supporting device 99 comprises an annular shaped member having at opposite sides flattened walls disposed parallel to each other and spaced a distance equal to the distance between the surfaces of the lugs 98, 98a, with which the cross members 97' and 101 engage, so that the segment 95 will be arranged parallel to the axis of the spindle 94. The tapes 96, 96a, extend around the segment 95 and upwardly around the plate 102 to which their inner ends are clamped by a bar 104 secured to the plate by cap screws 104. The tapes 96, 96a extend tangentially to the segment 95 to either side of the spindle 64 and in a plane parallel to the plane in which the spindle moves as shown in Fig. 6. In the preferred form of construction, I use four tapes, two of which wind around the segment 95 in one direction and are connected to connecting devices 106 and the remaining two of which wind around the segment 95 in the opposite direction and are connected to connecting devices 106a; furthermore, the tapes of each pair alternate with the tapes of the other pair.

107, 107a indicate uprights disposed upon the supplemental frame 3 beyond the ends of the slide 61, being spaced relatively to each other to permit free reciprocation of the slide 61. The uprights 107, 107a, are provided with guides 108 to slidably support blocks 109 to which the outer ends of the pairs of tapes 96, 96a, are connected by the connecting devices 106, 106a. Accordingly, it will be seen that when the work spindle 64 and segment 95 rotate in one direction, one pair of tapes will be wound thereon (while the other pair will unwind), thereby causing a pull on the adjacent upright 107, or 107a which pull effects a movement of the slide and work spindle toward said upright; then when the work spindle and segment rotate in the opposite direction the winding and unwinding of the tapes will be reversed so that the slide and work spindle will move toward the other upright, thus effecting a reciprocation of the slide and a combined oscillatory and translatory movement of the work spindle and gear. To permit of these operations, it of course will be understood that the arms 29 are slidable on the shaft 9' and the worm is splined thereto, as already set forth, so that the gear 28 is driven while the reciprocation of the slide is being effected. Each block 109 is formed with a screw threaded opening 110 to receive a screw 111, rotatably supported at its upper end in an opening formed in a plate 112, the latter being secured to the top of the adjacent upright 107 or 107a. The screw is provided with a suitable crank 112, whereby it may be operated. Each connecting device 106, 106a, comprises the following instrumentalities: 113 indicates a screw threaded rod or bolt extending through an opening formed in the upstanding arm 114 of the adjacent block 109. 115 indicates nuts fitting the bolt 113 and engaging the front and rear walls of the arm 114 and serving to secure the bolt thereto as well as permit its endwise adjustment to take-up or let out the adjacent tape. The inner end of the bolt 113 is provided with bifurcations 116, which are formed with aligned openings to receive a bolt 117. 118 indicates a plate, the inner end of which fits within the bifurcations and is secured therein by the bolt 117 passing through an opening formed in the plate 118. The outer end of the plate 118 co-operates with a movable plate 119 to clamp between them the outer end of the adjacent tape 96 or 96a, the latter being preferably folded over a pin 120 and the plates 118, 119, being provided with transverse grooves to receive the pin and folded tape end, to insure a positive grip of the latter. The plates 118, 119, are clamped together with the tape between them in any preferred manner, preferably by a bolt and nut 120a. If desired the plate 118 may be provided with a fulcrum 121 for the tail of the plate 119 to engage to insure clamping action between the free ends of the plates.

As already set forth, the machine herein disclosed is provided with tools B, B, which are located below the work piece A. The tools B, B, are mounted upon the side wall 1c of the frame 1 so as to be adjustable for various sizes of gears and at any desired angle of obliquity or pressure angle. As the supporting means for the tools B, B, are similar, it will be sufficient to describe one of such means. Of these means, 34 indicates a vertical plate preferably formed integrally with the front side wall 1c. The plate 34 is fashioned to serve as a guide for a shoe 35 which may be adjusted up or down on the plate 34, as desired. The shoe 35 is provided with a screw 36, which extends upwardly through a nut, supported in a casing 37 carried at the upper end of the plate 34. The nut is rotated by suitable gearing, which in turn is operated by a shaft 37 extending outwardly through casing 37 and shaped at its outer end to receive a tool. By rotating the nut, it will be seen that the shoe 35 will be raised or lowered. The shoe 35 may be of any desired construction, but is preferably provided with a suitable opening the walls of which form a bearing for rotatably supporting a plate 38. 39 indicates a tubular member carried by and preferably formed integrally with the plate 38 and serving as a housing or casing for bearings for the tool spindle 40. The spindle 40 extends through the housing 39 and carries at one end the adjacent tool B. At its other end, the spindle is connected to the armature shaft of an electric motor 41, by which it is driven. The casing of the motor 41 has an extended annular portion 42 which is flanged at 43, and the latter is secured to the end wall of the housing 39 by cap screws 44. From the foregoing description it will be seen that each tool B is driven by a separate motor. It will also be seen that the spindle 40 is supported intermediate its ends and the motor is connected thereto at the end opposite to the tool. Accordingly, the motor 41 serves to counter balance the weight of the tool B, its enclosing casing 45 and the trimming mechanism 46 carried by the housing 39. As shown in Figs. 1 and 3, each tool B comprises a relatively large abrasive wheel or disk having a planular face $b$ which engages a tooth face of the gear as the latter is rolled to effect the generation movement. Adjustment of the tool B to the proper pressure angle, is provided for by a worm gear segment 46' fixed to the plate 38 and meshing with a worm 47. The worm 47 is fixed to a shaft 48 supported in suitable bearings 49 mounted on the shoe 35, the shaft being extended to permit its operation by a suitable tool.

50 indicates a mechanism mounted on the housing 39 and engaging the spindle 40, whereby it may be adjusted relative to a tooth face. The trimming mechanism 46 may be of any desired construction, so as to move the diamond 46a into operative position when desired, and operate it as described below. In the preferred form, illustrated in the drawings, I provide a cylindrical housing 150, mounted to be adjustably propelled or slid backwardly or forwardly on ways 151 on the housing 39 (Figs. 1 and 4) by means of a screw 152 anchored in a head 153 on the housing 39 and rotatable by the hand crank 154. The axis of the cylindrical housing is parallel to the axis of the grinding wheel spindle 40. Mounted in the cylindrical housing 150 and adapted to be swung or oscillated about the axis thereof is a radially extending arm 155, in the outer end of which is a diamond carrier 156. The arm may be swung or oscillated about the axis of the cylindrical housing 150 by a hand crank 157, through worm and worm wheel connections, not shown, within the housing 150. The diamond carrier 156 is mounted for adjustment in the arm 155 in a direction substantially parallel to the axis of the cylindrical housing 150 and may be clamped in any adjusted position by a bolt or screw 160 and carries in its outer end the diamond 46a.

The interior details of construction of the cylindrical housing 150 and the arm 155 are or may be the same as shown in my prior application, Serial No. 561,219, filed May 15, 1922, and it is believed to be sufficient here to say that, on turning the hand crank 157 back and forth, the diamond 46a carried by the arm 155 will oscillate or swing in a plane parallel to the planular working face of the grinding wheel, for trimming or dressing the latter.

The above described parts are provided in duplicate sets as shown in the drawings, one set for each grinding wheel B. The wheel trimming or dressing devices 46—46, besides dressing the working faces of the grinding wheels to true planes, perform the additional essential function of positioning these planular faces or the planes thereof in proper spaced relation with respect to each other and with respect to the teeth of the gear being ground. This will now be described.

In order to grind two tooth faces at a time, the two planular working faces of the two grinding wheels B—B must, as will be understood, be adjusted not only to the proper pressure angle and to the position on the machine where the gear will roll over both of them, but they must also be set and maintained at an exact distance apart, at, say, the pitch line of the gear. This relative position of the wheels may be determined initially by trial adjustment on setting up the machine. Thereafter it may be accurately maintained by the trimming devices 46—46 as follows.

Permanent reference stations to which the diamonds 46a—46a may be referred at any time to determine their positions are provided, comprising end walls 159—159 in openings 158—158 in the stationary housings surrounding the grinding wheels. The walls 159—159 are preferably approximately in the plane of the wheel faces respectively, but need not be exactly in said planes, and, as a matter of fact, cannot both be in said planes except for grinding a gear of certain dimensions, size of teeth, etc. Each diamond may be swung outwardly into its corresponding opening 158 by the hand crank 157 and fed ahead axially by the hand crank 154 (as described above) until it touches the corresponding end wall 159. This position may be considered the zero position of the diamond, and after swinging it back inwardly out of the opening 158, it may be moved axially either forwardly or backwardly from the zero position any desired or known amount, by turning the hand crank 154 a corresponding number of turns or fractions of a turn. When, therefore, the planular wheel faces have once been set in the correct position by moving them by the mechanisms 50, and by dressing them to true planes by the diamonds, the position of each diamond relatively to its reference station 159 may then be noted; and thereafter the planular wheel face may be reset and redressed at any time and always restored thereby to said initial position by first bringing the diamond to its noted position relative to the reference station in the manner above described and then dressing the wheel face with the diamond.

By referring the diamonds back to the reference stations and then moving them to their predetermined correct dressing positions, all errors, due to wear of the diamond, lost adjustment of the diamond or of the wheel, renewal of the wheel, etc., are eliminated and the time otherwise necessary to readjust the machine is saved.

It will be apparent that the planular face of one of the grinding wheels may initially be set and dressed in such a position that its plane contains the reference station or end wall 159 so that the diamond for dressing that wheel and positioning the plane of that wheel may be set to its correct position simply by moving it into contact with the reference station. The other diamond, however, except in special cases, may have to be moved forward or backward from the position in which it touches the reference station.

Such a special case would be one in which only gears of certain dimensions and a given number and size of teeth were intended to be ground. The reference stations would then be located with respect to the desired working positions of the wheel faces and each diamond would then be moved into contact with its reference station and moved or swung in the plane of the station to dress the corresponding wheel face in a plane containing the station. The reference stations in addition may be made adjustable as to position to facilitate setting up the machine.

51 indicates an indexing mechanism for rotating the work spindle 64 predetermined distances, whereby each tooth face may be moved into position to be acted upon by a tool B. The indexing mechanism may be constructed to operate automatically in cooperative relation with the grinding operation so that indexing will take place during the period the gear is out of engagement with the tool or tools, or it may be of the manually operated type, as shown in the drawings. As shown, the arm 33 is fixed to the outer end of the sleeve 65 and carries a bracket 52 in which is movably mounted a pin 53 arranged to project into openings 54, successively, formed in a disk 54 carried on the free end of the work spindle 64 and secured thereto by the head of the bolt 66a. The pin is acted upon by a spring 56 to normally hold it in an opening 54, thereby serving to connect the disk 55 and arm 33 together so that the oscillations of the latter will be transmitted to the spindle 64. Indexing is effected by withdrawing the pin 53 from one of the openings, as the arm 33 oscillates in one direction and allowing the pin to enter the next opening 54 in the disk. As the spindle 64 stops upon the withdrawal of the pin and the latter enters the next opening in the disk, relative movement between the arm 33 and disk is effected so that in the next forward movement or rolling action of the gear adjacent tooth faces will be presented to the tools.

Figure 8:
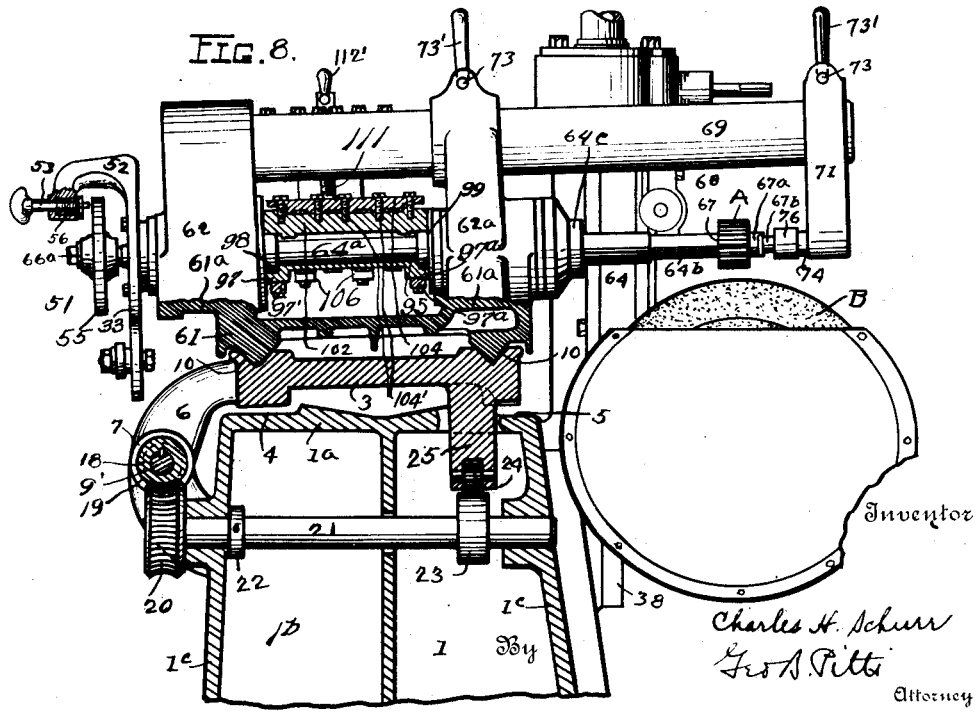
Fig. 8 is a fragmentary sectional view, similar to Fig. 5, but showing the supplemental frame, slide and work piece elevated, or swung upwardly.

In Fig. 7 I have illustrated the position of the slide 61 and gear A at the beginning of its rolling movement, that is, combined translatory and rotative movement, in one direction to the position shown in dotted lines, so as to be operatively engaged by the tools B; Fig. 1 showing the gear A in engagement with the tools B and two tooth faces being ground. This movement of the gear A is effected by the rotation of the gear 28 through one-half of its revolution, by the instrumentalities already referred to. As the gear 28 rotates through the other half of its revolution, and the gear A is rolling in the opposite direction, the cam 23 acts through the roller 24 to swing the supplemental frame 3, slide 61, work spindle 64 and the gear A, and other elements supported thereby, upwardly, about the axes of the pins 9, 9′, to the position shown in Fig. 8, so that in th's return movement of the gear A, it clears the tools B. The gear A thus follows or describes what may be termed a closed path of movement, that is, a movement out on one line and back to the starting point on another line, as distinguished from movement out and back over the same line or path.

As already described, during this latter movement of the gear A, and while it is out of engagement with the tools B, the gear A is indexed.

By arranging the shaft 9' on the axis on which the frame 3 swings, it will be seen that the upward swinging movement of the supplemental frame and the elements carried thereby may be readily effected while transmitting power to the work spindle and cam shaft 21.

To those skilled in the art of making apparatus of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:—

1. In apparatus of the class described, the combination with a main frame, of a supplemental frame movably mounted on said main frame, a slide mounted on said supplemental frame, a spindle rotatably mounted on said slide and adapted to carry a gear, a tool arranged to engage a gear carried on the spindle as it moves in one direction, means for reciprocating said slide and for oscillating said gear carrying spindle during the reciprocating of said slide, and means co-operating with said slide reciprocating and spindle oscillating means to move said supplemental frame relative to said main frame as the gear moves in the opposite direction to prevent engagement of said tool therewith.

2. In apparatus of the class described, the combination with a main frame, of a supplemental frame swingably mounted on said main frame, a slide mounted on said supplemental frame, a spindle rotatably mounted on said slide and adapted to carry a gear, a tool arranged to engage a gear carried on the spindle as it moves in one direction, means for reciprocating said slide and for oscillating said spindle during the reciprocating of said slide, and means arranged to swing said supplemental frame relative to said main frame as the gear moves in the opposite direction to prevent engagement of said tool therewith.

3. In apparatus of the class described, the combination with a main frame, of a supplemental frame swingably mounted on said main frame, a slide mounted on said supplemental frame, a spindle rotatably mounted on said slide and adapted to carry a gear, a tool arranged to engage a gear carried on the spindle, means for reciprocating said slide and for oscillating said spindle during the reciprocation of said slide, and a cam arranged to swing said supplemental frame relative to said main frame while the gear is moving in one direction to prevent engagement of said tool therewith.

4. In apparatus of the class described, the combination with a main frame, of a supplemental frame swingably mounted on said main frame, a slide mounted on said supplemental frame, a spindle rotatably mounted on said slide and adapted to carry a gear, a tool arranged to engage a gear carried on the spindle, means for reciprocating said slide and for oscillating said gear spindle during the reciprocation of said slide, means co-operating with said slide reciprocating and spindle oscillating means for swinging said supplemental frame relative to the said main frame as the gear moves in one direction in the complete movement of said slide, and means for indexing the gear.

5. In apparatus of the class described, the combination of a main frame, a pair of tools having their work faces disposed at angles for grinding two tooth faces of a gear simultaneously, a spindle adapted to carry a gear, and means for moving the gear carrying spindle rectilineally past the tools and laterally at the end of each rectilineal movement, whereby a gear carried on the spindle engages said tools as it moves in one direction and is disengaged therefrom as the gear moves in the other direction.

6. In apparatus of the class described, the combination of a main frame, a pair of tools having their work faces disposed at angles for grinding two tooth faces of a gear simultaneously, a spindle adapted to carry a gear, a support for the spindle; means for oscillating and reciprocating said spindle, and means for guiding and controlling the spindle support to permit engagement of a gear carried on the spindle with said tools as it moves in one direction, and means for moving said spindle laterally to prevent engagement of the tools with the gear as said spindle moves in the opposite direction.

7. In apparatus of the class described, the combination of a main frame, a pair of tools having their work faces disposed at angles for grinding two tooth faces of a gear simultaneously, a spindle adapted to carry a gear, a support for the spindle; means for oscillating and reciprocating said spindle, means for guiding and controlling the spindle support to permit of engagement of a gear carried on the spindle with said tools as it moves in one direction, means for moving said spindle laterally to prevent engagement of the tools with the gear as said spindle moves in the opposite direction, and means for indexing the gear while the spindle is moving in said opposite direction.

8. In apparatus of the class described, the combination with a frame, of a tool and a spindle therefor supported by said frame, a slide, a spindle on said slide adapted to carry a gear, means for reciprocating said slide and oscillating said spindle, whereby a gear carried on the spindle has a rolling movement relative to said tool, and means for moving said slide relative to said frame at an angle to the direction of its reciprocation while it is moving in one direction to prevent engagement of said tool with the gear.

9. In apparatus of the class described, the combination with a frame, a tool and a spindle therefor supported by said frame, a slide disposed above said tool, a spindle on said slide adapted to carry a gear, means for reciprocating said slide and oscillating said spindle, whereby a gear carried on the spindle has a rolling movement relative to said tool, and means for moving said slide relative to said frame at an angle to the direction of its reciprocation while it is moving in one direction to prevent engagement of said tool with the gear.

10. In apparatus of the class described, the combination with a main frame, of a supplemental frame, means for pivotally connecting said supplemental frame at the rear side of said main frame, a spindle mounted upon the front side of said main frame and carrying a tool, a slide mounted to reciprocate on said supplemental frame, a work spindle disposed transversely of said slide, a pair of supports mounted on said supplemental frame, connections between said supports and said work spindle arranged to effect reciprocation of said slide as the said spindle oscillates, means for oscillating said spindle, and means for swinging said supplemental frame about its pivotal connection during movement of the slide in one direction.

11. In apparatus of the class described, the combination with a main frame, of a supplemental frame, means for pivotally connecting said supplemental frame at the rear side of said main frame, a spindle mounted upon the front side of said main frame and carrying a tool, a slide mounted to reciprocate on said supplemental frame, a work spindle disposed transversely of said slide, a pair of supports mounted on said supplemental frame, connections between said supports and said work spindle arranged to effect reciprocation of said slide as the said spindle oscillates, means for oscillating said spindle, and a cam for swinging said supplemental frame about its pivotal connection during movement of the slide in one direction.

12. In apparatus of the class described, the combination with a main frame, of a supplemental frame, means for pivotally connecting said supplemental frame at the rear side of said main frame, a spindle rotatively mounted upon the front side of said main frame and carrying a tool, a slide mounted to reciprocate on said supplemental frame, a work spindle disposed transversely of said slide, means for oscillating said work spindle, said pivotally connecting means including an element through which power is transmitted to said oscillating means, a segment on said work spindle, a pair of supports mounted on said supplemental frame, tapes connected to said supports and said segment and arranged to wind on and off of the latter as said work spindle oscillates to effect reciprocation of said slide, and means for swinging said supplemental frame about its pivotal connection during movement of the slide in one direction.

13. In apparatus of the class described, the combination of a frame, a work spindle, means for reciprocating and oscillating said work spindle, a pair of tool spindles, a pair of supports each provided with a bearing for one of said tool spindles, means for adjustably supporting each said support, whereby it may be moved vertically or angularly to support the adjacent tool at different angles with respect to the work, and a motor carried by each said support beyond the supporting means therefor and having driving connections with the adjacent tool spindle.

14. In an apparatus of the class described a carrying element adapted to carry a work gear, a tool, means for moving the element to cause a gear when carried on the element to travel to and fro in a closed path of movement on a part of which path the gear moves in one direction relatively to the tool in working engagement therewith and on the remainder of which path the gear moves relatively to the tool in the return direction not in engagement therewith.

15. In an appartus of the class described, a carrying element adapted to carry a work gear, a tool, means for moving the element to cause a gear when carried on the element to travel to and fro in a closed path of movement on a part of which the gear moves in one direction relatively to the tool in working engagement therewith and on the remainder of which the gear moves in a return direction relatively to the tool not engaged therewith, and means for indexing the gear on the return part of the path.

16. In an apparatus of the class described a carrying element adapted to carry a work gear, a tool, means for moving the element to cause a gear when carried on the element to travel to and fro in a closed path of movement a part of which is rectilinear and on which the gear moves in one direction relative to the tool in working engagement therewith and the remainder of which is non-rectilinear on which the gear moves past the wheel in the return direction not in engagement therewith.

17. In an apparatus of the class described a carrying element adapted to carry a work gear, a tool, means for moving the element to cause a gear when carried on the element to travel to and fro in a closed path of movement, a part of which is rectilinear on which the gear moves in one direction relative to the tool in working engagement therewith and on the remainder of which the gear moves in the return direction relative to the tool not in engagement therewith, and means for indexing the gear on the return part of the path.

18. In an apparatus of the class described a carrying element adapted to carry a work gear, a tool, means for moving a gear when carried on the element and tool relatively to each other to and fro on a closed path of movement composed of a working portion on which the gear is in working engagement with the tool and of a return portion on which the gear is out of working engagement with the tool and means for relatively indexing the gear and tool on the return portion.

19. In an apparatus of the class described a carrying element adapted to carry a work gear, a tool, means for moving the element, means to cause a gear when carried on the element to travel relatively to the tool in one direction in working engagement therewith, and means for moving the element bodily about an axis of rotation to cause the gear to travel relatively to the tool in the return direction not in engagement therewith.

20. In an apparatus of the class described a main frame, a supplemental frame adapted to be supported in a position of rest upon the main frame and movable relatively thereto out of said position of rest, a movable carrying element on the supplemental frame adapted to carry a work gear, a tool below the element adapted to be engaged by a gear carried on the element when the supplemental frame is in said position of rest and means for moving the supplemental frame to prevent the gear from engaging the tool.

21. In an apparatus of the class described a main frame, a movable carrying element adapted to carrying a work gear, a tool below the element, means for moving the element to cause a gear carried on the element to engage the tool and for lifting the spindle bodily to prevent the gear from engaging the tool.

22. In an apparatus of the class described a main frame, a supplemental frame adapted to be supported in a position of rest on the main frame and adapted to be moved relatively thereto out of the position of rest, a carrying element adapted to carry a work gear on the supplemental frame, a tool below the element, means for moving the element to cause a gear carried on the element to move in one direction relatively to the tool in working engagement therewith when the supplemental frame is in said position of rest and to cause the gear to move in the return direction relatively to the wheel not in engagement therewith when the supplemental frame is moved out of said position of rest.

23. In an apparatus of the class described the main frame, a movable carrying element adapted to carry a work gear, a tool below the element means for moving the element to cause a gear carried on the element to engage the tool and for rotating the element bodily upwardly on an axis of rotation to prevent the gear from engaging the tool.

24. In an apparatus of the class described, a pair of tools, a carrying element adapted to carry a work gear, means for moving the element to cause a gear when carried on the element to travel in a closed path of movement on a part of which path the gear moves relatively to the tools in engagement therewith to work simultaneously two tooth faces of the gear, and on the remainder of which path the gear moves relatively to the tools not in engagement therewith.

25. A gear grinding machine comprising a frame, a grinder wheel having a working surface lying in a plane inclined at an angle to the horizontal equal to 90 degrees minus the pressure angle of a gear to be ground, said grinder wheel being of relatively large diameter whereby it is adapted to simultaneously operate over the entire width of a gear tooth to be ground, an arbor adapted to receive the gear to be ground, said arbor being arranged above said grinder wheel, and means for simultaneously imparting horizontal reciprocatory movement and oscillatory movement to said arbor whereby a gear on the arbor is given a rolling generating movement with respect to said working surface.

26. In apparatus of the class described, the combination of a main frame, a grinding wheel, a spindle mounted above the wheel and adapted to carry a work gear and adapted to be reciprocatively moved, means for moving it rectilinearly past the grinding wheel in one direction of reciprocation whereby a tooth on the under side of a gear carried on the spindle engages said wheel, and means for causing the spindle to move upwardly at the end of said rectilinear movement whereby, on movement of the spindle in the other direction of reciprocation, the gear is prevented from engaging the wheel.

27. In apparatus of the class described, the combination of a main frame, a pair of grinding wheels having their working faces disposed at angles with each other for grinding two tooth faces of a gear simultaneously, a spindle mounted above the wheels and adapted to be reciprocatively moved and adapted to carry a work gear, means for moving the spindle along a rectilinear path past the wheels in one direction whereby teeth on the under side of a gear carried on the spindle engage said wheels, and means for moving the spindle out of said path at the end of said rectilinear movement to prevent the teeth of the gear from engagement with the wheels upon movement in the other direction.

28. In a gear grinding apparatus, a main frame, a spindle adapted to support a gear to be ground, a pair of gear grinding wheels having plane working faces disposed relative to each other at an included angle of twice the pressure angle of the gear to be ground, the spindle being mounted above the wheels and supported for reciprocatory movement, means for reciprocatively moving the spindle, means stationary relative to the frame for simultaneously rotating the spindle and acting on the spindle in the direction of a plane tangential to the lower side of the pitch circle of the gear to be ground when on the spindle, the combined rotary and reciprocatory movements causing the gear to roll on its pitch circle on a line below its center and causing two teeth on the lower side of the gear to engage and be ground by the two wheels respectively.

29. In an apparatus of the class described, a carrying element adapted to carry a work gear, a tool, means for moving the element to cause a gear, when carried thereby, to travel in a closed path of movement relative to the tool, a part of which path is rectilinear.

30. In an apparatus of the class described, a carrying element adapted to carry a work gear, a tool, means for moving the element to and fro to cause a gear, when carried on the element, to travel in a closed path of movement and to engage the tool in one direction of movement only.

31. In an apparatus of the class described, a carrying element adapted to carry a work gear, a tool, means for moving the element to and fro to cause a gear, when carried on the element, to travel in a closed path of movement, a part of which path is rectilinear and on which part the gear engages the tool in one direction of movement only.

In testimony whereof, I have hereunto subscribed my name.

CHARLES H. SCHURR.